United States Patent
Kamimura et al.

[11] Patent Number: 6,149,307
[45] Date of Patent: Nov. 21, 2000

[54] RELATIVELY MOVABLE UNIT WITH ROLLING ELEMENTS

[75] Inventors: Akihiko Kamimura; Shigemasa Itabashi, both of Kanagawa-ken, Japan

[73] Assignee: Nippon Thompson Co., Ltd., Tokyo, Japan

[21] Appl. No.: 09/203,484

[22] Filed: Dec. 2, 1998

[30] Foreign Application Priority Data

Dec. 19, 1997 [JP] Japan .................................. 9-364294

[51] Int. Cl.$^7$ ........................... F16C 29/06; F16H 25/22
[52] U.S. Cl. .................. 384/49; 384/13; 384/520; 74/459
[58] Field of Search .................. 384/13, 43, 45, 384/49, 520, 470; 74/459, 89.15, 424.8 R

[56] References Cited

U.S. PATENT DOCUMENTS

| | | | |
|---|---|---|---|
| 2,897,021 | 7/1959 | Zeilman | 384/520 |
| 3,220,785 | 11/1965 | Noll et al. | 384/604 |
| 3,336,090 | 8/1967 | Aller | 384/49 |
| 4,022,516 | 5/1977 | Smith et al. | 384/520 |
| 4,761,820 | 8/1988 | Frank et al. | 384/520 |
| 5,615,955 | 4/1997 | Namimatsu et al. | 384/13 |
| 5,711,610 | 1/1998 | Deck | 384/49 |
| 5,749,266 | 5/1998 | Tsukada | 74/459 |
| 5,927,858 | 7/1999 | Agari | 384/45 |

FOREIGN PATENT DOCUMENTS

| | | |
|---|---|---|
| 86757 | 2/1966 | France . |
| 64-041724 | 3/1989 | Japan . |
| 64-053521 | 4/1989 | Japan . |
| 2-163550 | 6/1990 | Japan . |
| 7-054844 | 2/1995 | Japan . |
| 8-170641 | 7/1996 | Japan . |
| 10-281154 | 10/1998 | Japan . |

OTHER PUBLICATIONS

Patent Abstract of Japan vol. 1999, No. 01, (Jan. 29, 1999) and JP 10–281154 A (Nippon Thompson Co. Ltd) (Oct. 20, 1998).
Patent Abstract of Japan vol. 018, No. 512 (M–1679), (Sep. 27, 1994) and JP 06–173946 A (Koyo Seiko Co. Ltd) (Jun. 21, 1994).
Patent Abstract of Japan vol. 012, No. 113 (M–683), (Apr. 9, 1988) and JP 62–24$_2$126 A (Minoru Suda) (Oct. 22, 1987).

*Primary Examiner*—Thomas R. Hannon
*Attorney, Agent, or Firm*—Browdy and Neimark

[57] ABSTRACT

A relatively movable unit with rolling elements, or balls, adapted for use in a linear motion guide unit or a ball nut screw assembly. The relatively movable unit has lubricating rings disposed between any adjoining balls to thereby lubricate the balls. In the linear motion guide unit employing this relatively movable unit, the balls are confined in raceways at the interfaces between a track rail and a slider, while the lubricating ring is arranged between the adjoining balls. The lubricating ring is provided therein with spherical pockets opened to each other through a window at the center of the ring. The lubricating ring may be produced by forming a mixture of lubricant of turbine oil with resinous material of ultrahigh molecular weight polyethylene powder in a mold under pressure, and heating the molded mixture under pressure.

15 Claims, 6 Drawing Sheets

RELATIVELY MOVABLE UNIT WITH ROLLING ELEMENTS

BACKGROUND OF THE INVENTION

1. Field of the Invention

The present invention relates to a relatively movable unit adapted for use in a linear motion guide unit, a ball nut and screw assembly or the like incorporated in machine tools, assembly machine, testing instruments or the like, and constructed so as to make relatively sliding movement by means of rolling elements which are movable between the confronting raceway grooves.

2. Description of the Prior Art

The recently remarkable development in mechatronics technology requires linear motion guide units improved in precision, speed and miniature and the use of such apparatus extends into many technical fields. The relatively movable units such as linear motion guide units, ball nut and screw assembly or the like are in general employed in various machines and apparatus. The relatively movable units are required more and more to deal with the high-speed moving, miniaturization and increase in load carrying capacity, and also help ensure the long-term durability, low-noise and low-vibration in operation, and determine precisely the position of instruments and devices.

The linear motion guide unit shown in FIG. 9 is a well-known example of a relatively movable unit. The conventional linear motion guide unit has a sliding element, or slider 1, saddling on a track rail 2 so as to freely move along and with respect to the track rail by virtue of circulation of rolling elements, or balls 7, along the raceway grooves 4 on the rail 2. The track rail 2 has on lengthwise side surfaces 3 thereof with raceway grooves 4 and has on lengthwise upper surface thereof with openings 13 spaced from each other. The track rail 2 is fixed together with the mounting base 15, such as a bed, machine base, work table or the like, by screwing bolts through the openings 13 of the track rail 2 and openings in the mounting base 15. The slider 1 has a casing 5 movable with respect to the track rail 2, and end caps 6 bolted at 16 to the opposing ends of the casing 5. Provided on the upper surface of the casing 5 are openings 19 for fixture to other appliances, parts, chucks, grasping jaws or the like. Both of casing 5 and the end caps 6 are formed on the lower surfaces thereof with recesses 10 by which the casing 5 and end caps 6 may saddle on track rail 2 for free movement. The recesses 10 are each formed with a raceway groove 9 in opposition to any one of the raceway grooves 4 on the track rail 2. The rolling elements, or balls 7, are confined for free movement in raceways 26 defined by the raceway grooves 4 and 9. Retainer bands 18 are provided in the casing 5 so as to surround balls 7 to thereby prevent the balls 7 from falling out of the casing 5. Bottom seals 8 are secured to the lower surfaces of the slider 1 for sealing between the track rail 2 and the slider 1.

The end caps 6 are provided with claws for scooping up the balls 7 from the raceway grooves 4 forming the load areas with the track rail 2. The end caps further have turnaround passages for endless circulation of the balls 7. Mounted on the end caps 6 are end seals 17 for keeping sealing function between the track rail 2 and the lengthwise opposing ends of slider 2. The balls 7 move along the load areas, that is, the raceway grooves 4 of the track rail 2 and then come in the turnaround passages in the end caps 6. The balls 7 further move to the return passages 12 which are formed in the casing 5 in parallel with the raceway grooves 9. It will be thus understood that the balls 27 may run in a circulating manner though the raceways, turnaround passages and return passages 12. As a result, the slider 1 may move smoothly and relatively to the track rail 2 by the action of the balls 27 that run through the load areas along the raceways 26. The substance most frequently used as lubricants for the prior linear motion guide unit have been greases or lubricating oils. Greases are fed from grease nipples 11 on balls 7 in the raceways 26, whereas lubricating oils are fed through pipe joints instead of the grease nipples.

Shown in FIG. 10 is a prior ball nut and screw assembly 40 of conventional tube type. The ball nut and screw assembly 40 is comprised of a screw shaft 41 having an external helical groove 43 extending along the outer peripheral surface thereof, and a nut 42 mounted on the screw shaft 41 for translational motion. A tube 45 is secured in the nut 42 by means of a tube retainer 46 and the rolling elements, or steel balls 44, are loaded so as to run in a circulating manner through an internal helical groove 47 in the nut 42 to the tube 45. As any one of the screw shaft 41 and nut 42 rotates with respect to the other, the balls 44 run along the helical groove in the nut 42 whereby any one of the shaft 41 and nut 42 moves relatively to the other in a translational moving relation. A helical raceway 49 on which the balls 44 run is defined by the external helical groove 43 on the screw shaft 41 as a first raceway groove and the internal helical groove 47 in the nut 42 as a second raceway groove. The tube 45 is connected with both of opposing ends of the helical raceway 49 to thereby provide a return passage 48 for endless circulation of the balls 44.

As will be seen from the foregoing, in the prior linear motion rolling guide unit, the balls 7 may run in the slider 1 in a circulating manner as the slider 1 moves linearly along the track rail 2. In the prior ball nut and screw assembly shown, the balls 44 may run in the nut 42 in a circulating manner as the nut 42 moves relatively to the shaft 41.

When the balls 7 run through the load areas defined between the confronting slider 1 and tack rail 2 in the linear motion guide unit, metal-to-metal contact may happen between any adjacent balls. In other words, the balls are brought into the metal-to-metal contact between any adjacent balls closely approaching each other, which closest approach may be caused by the deformation occurring in the raceways owing to the circularity of the ball, the flatness of the track rail, or the uneven load exerted externally. All balls roll in the same direction and thus the peripheral velocities at the contact interfaces of the adjoining balls are reverse in direction with respect to each other. As a result, the frictionally resistant force occurring at the metal-to-metal contact surfaces of the adjoining balls impedes the smooth rolling of the balls. Upon the slider moving in a sliding manner under the condition as described above, the balls primarily roll, but sliding and/or repeated collisions with the adjoining balls or raceway grooves occur, resulting in generation of noise and vibration of relatively high frequency and in premature wear. Hence, the prior linear motion guide unit is apt to be in general reduced in accurate guide ability as well as in durability. In case the moving stroke of the slider 1 along the track rail 2 is less than a few millimeters, it has been experienced that the frictional wear due to a failure of lubricant film is apt to happen at the surfaces of the balls and raceways. However, it has been very hard to eliminate the frictional wear in the prior lubrication systems by which greases or lubricating plates are not applied directly to the balls, but solely applied to the raceways of the track rail.

The prior ball nut and screw assembly has the problem, similar that in the linear motion guide unit, of the frictional wear caused by the metal-to-metal contact of the balls 44.

Any of the linear motion guide units and the ball nut and screw assembly have been recently more and more employed in various wide operating environments including severe lubricating conditions where it is hard to supply the lubricants such as greases, or a scatter of lubricants is not permitted. Further depending upon the operating conditions, the maintenance-free designs may be required, with accompanying reduced lubricant replenishment. To cope with this requirement, it has been already known to incorporate a lubricant-containing member in to the slider.

Disclosed in Japanese Patent Laid-Open No. 170641/1996 is, for example, a linear motion guide unit of self-lubricating type capable of automatically supplying lubricants to the balls. Ball spacers of polymers containing lubricants are each inserted between any adjoining rolling elements and the lubricants exude little by little therefrom to be supplied automatically onto the surfaces of the balls and endless circulating passages.

Japanese Patent Laid-Open No. 54844/1995 discloses another linear motion guide unit of self-lubricating type capable of automatically supplying lubricants to the balls. Polymers containing therein lubricants are used for tubes fitted in holes for ball-return passages in a slider, a part of turnaround paths and ball retainers in raceways defining load areas.

In a linear motion ball bearing unit for guiding linearly a slider body along a rail, disclosed in Japanese Utility Model Laid-Open No. 41724/1989, a slider body is provided with bores for ball-return paths which are communicated for the circulation of balls with raceways defined between the confronting slider body and rail. The bore surfaces are coated with self-lubricating members.

Another type of the linear motion ball bearings, disclosed in Japanese Utility Model Laid-Open No. 53521/1989, is provided with endless circulation paths which are comprised of ball-return zones in a slider body and load zones defined by confronting grooves on the slider body and rail. The circulation paths are filled with balls of solid steel balls and lubricating balls, which are arranged alternately in the paths. The lubricating balls are made of a substance having self-lubricating property or a porous member impregnated with lubricants.

Japanese Patent Laid-Open No. 163550/1990 has for its object to prevent metal-to-metal contact of steel balls with a failure of lubricants. The disclosed ball nut and screw assembly is provided with balls of diameters less than that of the steel balls. The balls are made of materials having self-lubricating property, for example, materials having a layer lattice structure represented by molybdenum disulfide, soft metals represented by gold, silver and lead, and polymers represented by tetrafluoroethylene. The materials exemplified above are solid lubricants that do not vaporize even in the vacuum atmosphere, but may lubricate the interfaces of metals resulting in reducing frictional wear.

According to the prior linear motion guide units of the types described above, at least any one of the raceways and balls is partially composed of materials impregnated with lubricants, so that any special processing should be required to any one or both of the raceways and balls. Such raceways and balls may be automatically fed with lubricants, but they are lacking in mechanical strength withstanding large load because of the lubricant-impregnated materials having no strength as high as the steel.

SUMMARY OF THE INVENTION

The present invention, therefore, has as its primary object the provision of an improvement in a relatively movable unit such as a linear motion guide unit, ball nut and screw assembly or the like, employing just the conventional rolling elements and raceways along which the rolling elements run, the improvement in which the rolling elements may be automatically applied with lubricants by self-lubricating means even with no lubricant replenishment whereby large loads may be supported without deformation and damage such as premature wear due to a failure of lubricant film.

It is an object of the present invention to provide a relatively movable unit with rolling elements, comprising a first member provided with first raceway grooves, a second member movable relative to the first member and provided with second raceway grooves confronting with the first raceway grooves, rolling elements movable along raceways defined between the confronting first and second raceway grooves, and at least one lubricating ring interposed between any adjoining rolling elements so as to run through the raceways together with the rolling elements while lubricating the rolling elements.

Another object of the present invention is to provide a lubricating ring of a configuration having a cylinder of cross-section along a direction normal to the raceways.

A further object of the present invention is to provide a lubricating ring provided inside thereof with spherical pockets for partially receiving the adjoining rolling elements.

A further object of the present invention is to provide a lubricating ring having a window at the center thereof, through which the adjoining rolling elements are brought into contact with each other.

An additional object of the present invention is to provide a relatively movable unit with rolling elements, wherein the rolling elements and lubricating rings run along endless circulation passages inclusive of the raceways in freely circulating movement.

Another object of the present invention is to provide a relatively movable unit with rolling elements, wherein the endless circulation passages are comprised of the raceways formed by the second raceway grooves on the second member, turnaround-paths provided in end caps secured to the opposing ends of the second member so as to communicate with the raceways, return-paths provided in the second member so as to communicate with the turnaround-paths.

A further object of the present invention is to provide a relatively movable unit with rolling elements, wherein other adjoining rolling elements between which no lubricating ring is disposed are spaced apart by a separator for keeping the adjoining rolling elements in a spaced relation in the circulation paths.

An additional object of the present invention is to provide a relatively movable unit with rolling elements, wherein the lubricating rings and the separators are arranged according to a predetermined consecutive relation. For example, such arrangement pattern may be adopted that any separator is disposed every predetermined interval of rolling elements and the lubricating rings are interposed between the adjoining rolling elements which are located in the interval.

Another object of the present invention is to provide a relatively movable unit with rolling elements, which is adapted for use in a linear motion guide unit comprising a track rail for providing the first member having on lengthwise opposing side surfaces thereof the first raceway grooves for the first raceways, and a sliding element for providing the second member mounted on the track rail for sliding movement relative to the track rail through the rolling elements.

A further object of the present invention is to provide a relatively movable unit with rolling elements, wherein the sliding element has a casing and end caps secured to the opposing ends of the casing, the casing being provided with second raceway grooves for defining the raceways in cooperation with the first raceway grooves, the casing further being provided therein with the return-paths for the rolling elements, and the end caps being formed therein with the turnaround-paths for guiding the rolling elements from the raceways to the return-paths.

Another object of the present invention is to provide a relatively movable unit with rolling elements, which is adapted for use in a ball nut and screw assembly comprising a screw shaft having a first helical groove equivalent to the first member having the first raceway grooves, a nut equivalent to the second member mounted on the screw shaft for rotating movement relative to the screw shaft.

A further object of the present invention is to provide a relatively movable unit with rolling elements, wherein the nut is provided with a helical groove equivalent to the second raceway grooves, the helical groove being formed in confrontation with the first helical groove so as to define the raceway therebetween, and a return-path communicated with the raceways at the opposing ends thereof so as to allow the rolling elements to run in a circulating manner.

Another object of the present invention is to provide a lubricating ring adapted for use in a relatively movable unit with rolling elements, wherein the lubricating ring is produced by forming a mixture of resinous materials with lubricants in a mold under pressure, and heating the molded mixture under pressure.

A further object of the present invention is to provide a molding machine for producing the lubricating ring, wherein the molding apparatus comprises annular molds to be filled with the mixture, steel balls equivalent in configuration to the rolling elements disposed between any adjacent annular molds, a casing having a cavity in which the annular molds and steel balls are alternately arranged, pushing means for compressing the mixtures in the annular molds so as to bring the steel balls into contact with each other, and heating means provided around the casing to heat the mixtures in the annular mold.

A further object of the present invention is to provide a molding machine adapted for producing the lubricating ring, wherein the annular mold is of a hollow cylinder, and the balls are charged in the cavity in the casing so as to be closely fitted with substantially no clearance while allowed to make rotation relative to each other.

An additional object of the present invention is to provide a molding machine adapted for producing the lubricating ring, wherein the annular mold is closed at opposing axial openings thereof with the steel balls which are brought into engagement with inner peripheral edges of the openings.

The relatively movable unit designed as described above allows to adopt just the prior type of relatively movable unit such as the linear motion guide unit or the ball nut and screw assembly without changing specifications. The lubricating rings may be disposed with making use of the clearances that have already occurred in between the rolling elements in the prior relatively movable units. As a result, the lubricating rings may be at least partially in contact with any adjoining rolling elements to thereby lubricate the rolling elements.

On the production of the lubricating rings in the molding apparatus, the annular molds and steel spheres are alternately charged in the cylindrical cavity in the casing. At the same time the mixture of lubricants with resinous materials is poured in the annular mold. The mixture confined in each space defined by the steel spheres and interposed annular mold is heated while the steel spheres and annular rings are arranged in a row where any adjoining spheres are in contact with each other in any annular mold interposed between the spheres. Therefore, the lubricating rings may be continuously, effectively mass-produced by virtue of just the spherical surfaces of the steel spheres.

For lubrication of the rolling elements, the prior linear motion guide unit or the ball nut and screw assembly has been inevitably required to change the specifications of components or parts, or provide additional clearances. Whereas the relatively movable unit of this invention may provide positive lubrication for the rolling elements by merely disposition of any lubricating ring in the clearance between the adjoining rolling elements without accompanying the changes in primary specifications of the prior relatively movable units.

The lubricating rings are each interposed between any clearance where any adjoining rolling elements are in contact with each other and also make contact with the rolling elements through only the lubricant film. Hence the lubricating rings may save from the large load such as that applied to the rolling elements, resulting in no premature wear as well as no generation of abrasion dust. Moreover, the lubricating rings of this invention may serve as buffers for absorbing noise due to the collision of the rolling elements against the track rail and thus has the function of quieting. The lubricating rings may be successively, inexpensively produced by the molding apparatus simple in structure, because the rings are fabricated by the mere steps of charging alternately the annular molds and steel spheres in the cylindrical casing, and pouring the mixture of lubricants with resinous materials in the annular molds.

The lubricant replenishment through the nipple may be used in addition to the lubricating rings. The relatively movable unit of the present invention may be made to remain lubricated for a long term even the external supply of lubrication is interrupted or fails. This relatively movable unit is adapted for use in clean environment because of no scatter of lubricants.

Other objects and features of the present invention will be more apparent to those skilled in the art on consideration of the accompanying drawings and following specification wherein are disclosed preferred embodiments of the invention with the understanding that such variations, modifications and elimination of parts may be made therein as fall within the scope of the appended claims without departing from the spirit of the invention.

DETAILED DESCRIPTION OF THE PREFERRED EMBODIMENTS

Referring now in detail to the drawings, the linear motion guide unit provided with the rolling elements according to the present invention will be explained below.

Figure 9:
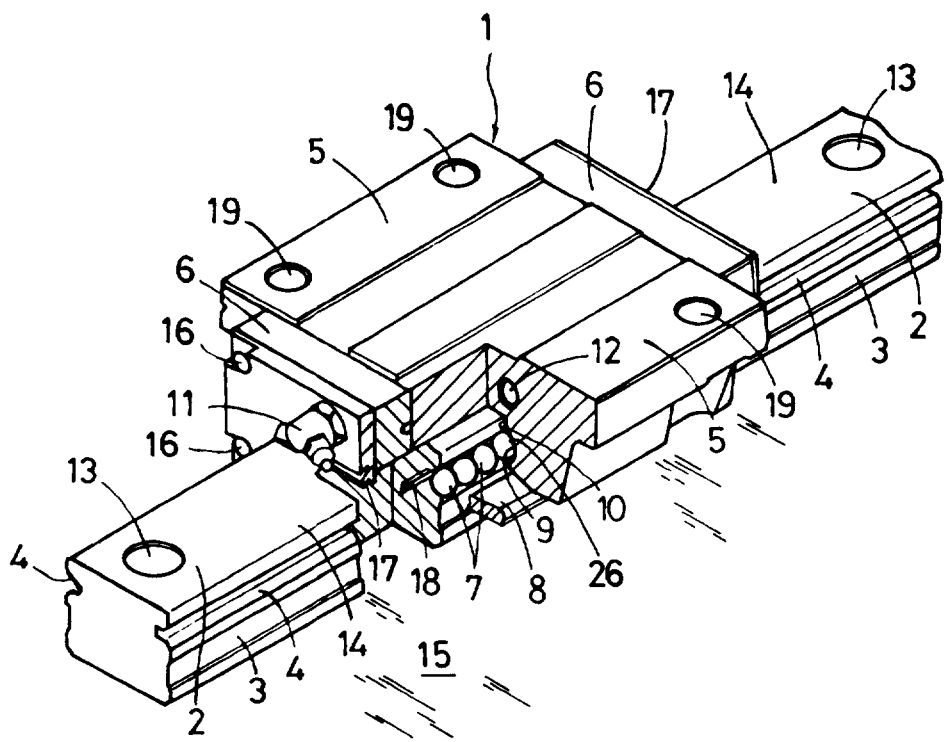
FIG. 9 is a partially cutaway perspective view showing a prior linear motion guide unit.
Figure 10:
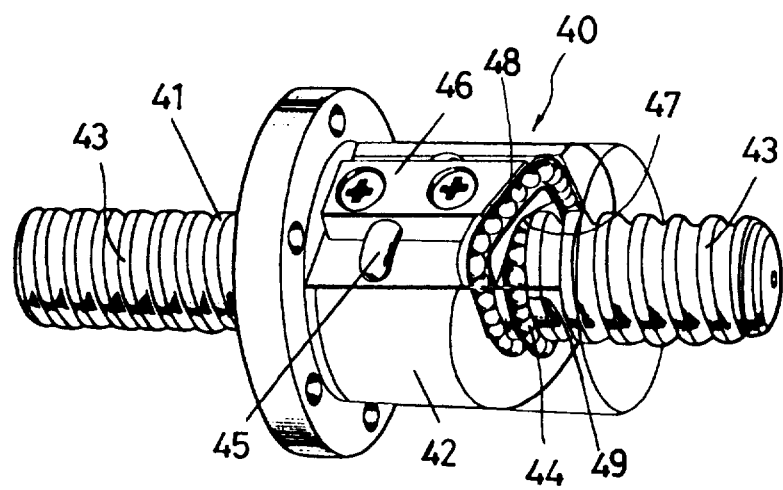
FIG. 10 is a partially cutaway perspective view showing a prior ball nut and screw assembly.

Referring to FIGS. 1 to 4, there are illustrated rolling elements, or balls 7, and lubricating rings 20, 22 to be incorporated in relatively movable units such as the linear motion guide unit shown in FIG. 9, or the ball nut and screw assembly in FIG. 10. As the prior arts may be just employed for the linear motion guide unit and ball nut and screw assembly, the same reference character identifies equivalent or same parts in the prior arts and the repetition of the same parts and the operation thereof will be omitted.

Figure 1:
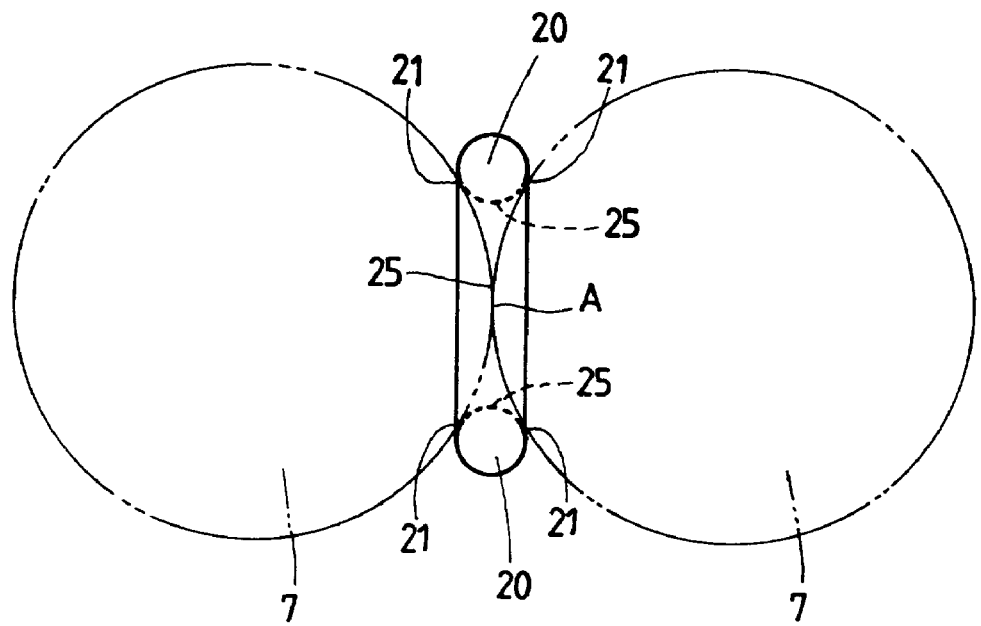
FIG. 1 is a side elevation view showing a preferred embodiment of a lubricating ring, which is adapted for use in a relatively movable unit with rolling elements according to the present invention.
Figure 2:
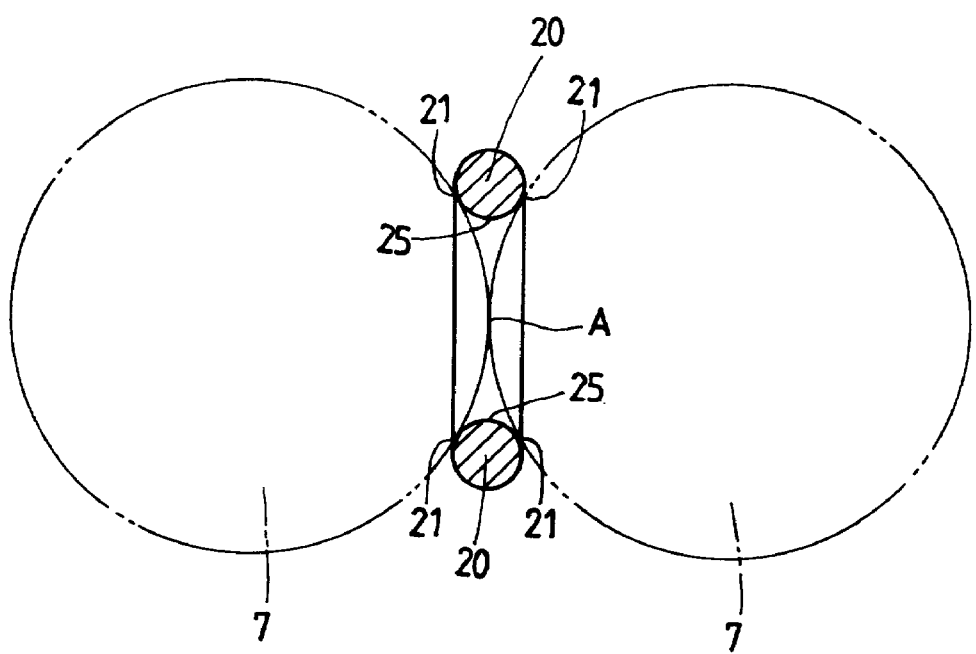
FIG. 2 is a section view of the lubricating ring shown in FIG. 1.

The lubricating rings 20 in FIGS. 1 and 2 are each disposed in a clearance between any adjoining rolling elements, or steel balls 7. The lubricating ring 20 is of an annular member having a circular cross-section taken along any plane involving the centers of the balls 7, in other words, showing a circle in the section normal to the circumferential direction thereof. The adjoining steel balls 7 described with dashed lines make contact with each other at a center A of an opening 25 in the lubricating ring 20, which holds the balls in sliding contact relation at an arced surface 21 thereof for supplying lubricants on the surfaces of the balls 7.

Figure 3:
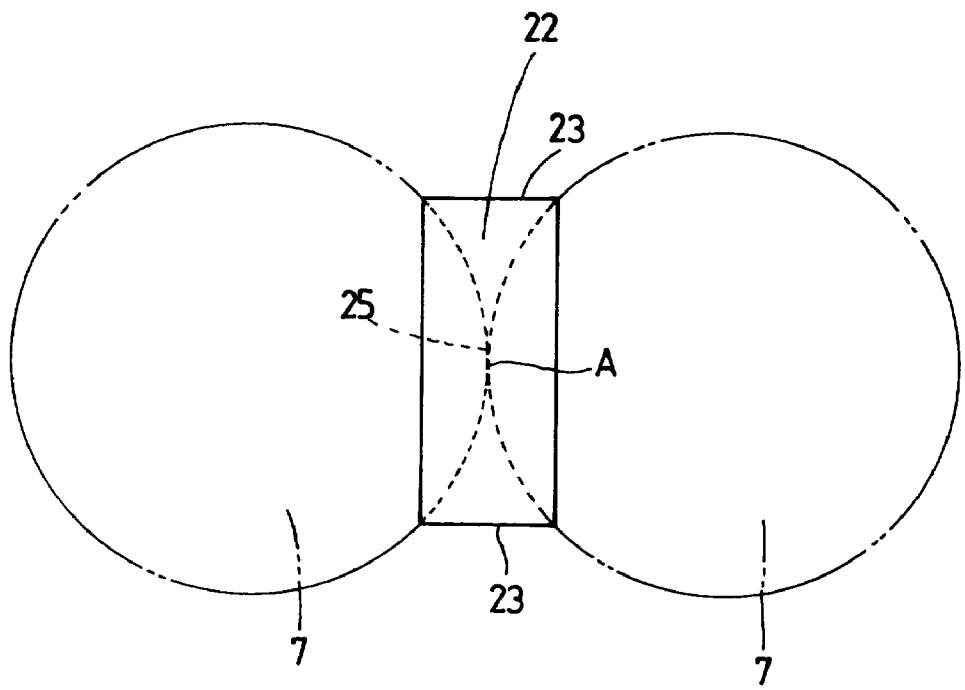
FIG. 3 is a side elevation view showing an another embodiment of a lubricating ring, which is adapted for use in a relatively movable unit with rolling elements according to the present invention.
Figure 4:
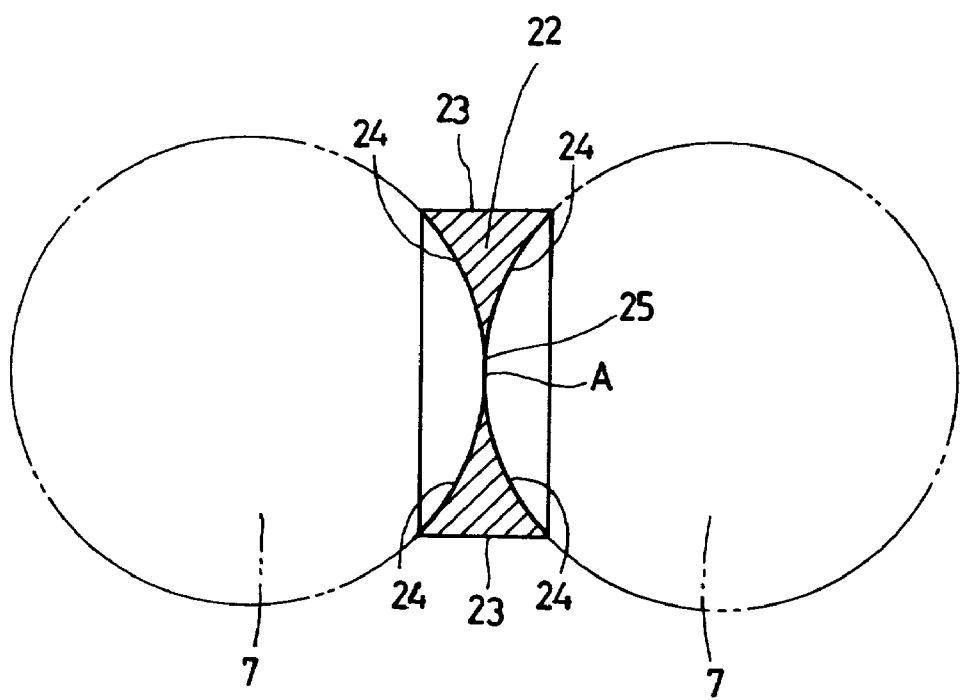
FIG. 4 is a section view of the lubricating ring shown in FIG. 3.

Another lubricating ring 22 embodying the present invention shown in FIGS. 3 and 4 is also disposed in a clearance between any adjoining rolling elements, or steel balls 7. The lubricating ring 22 is of an annular member which has a cylindrical outer surface 23 and is provided inside thereof with spherical pockets for partially receiving the adjoining balls 7. In other words, the lubricating ring 22 is designed such that any cross-section normal to the circumferential direction thereof has two arced sides and one straight line. The lubricating ring 22 is further provided at the center thereof with a window 25 so that the adjoining balls 7 confined partially in the pockets may make contact with each other through the window 25.

Having described the cross-sectional configurations of the lubricating rings 20 and 22, it is believed obvious the other modification and variation may be allows in light of the above teachings.

Figure 5:
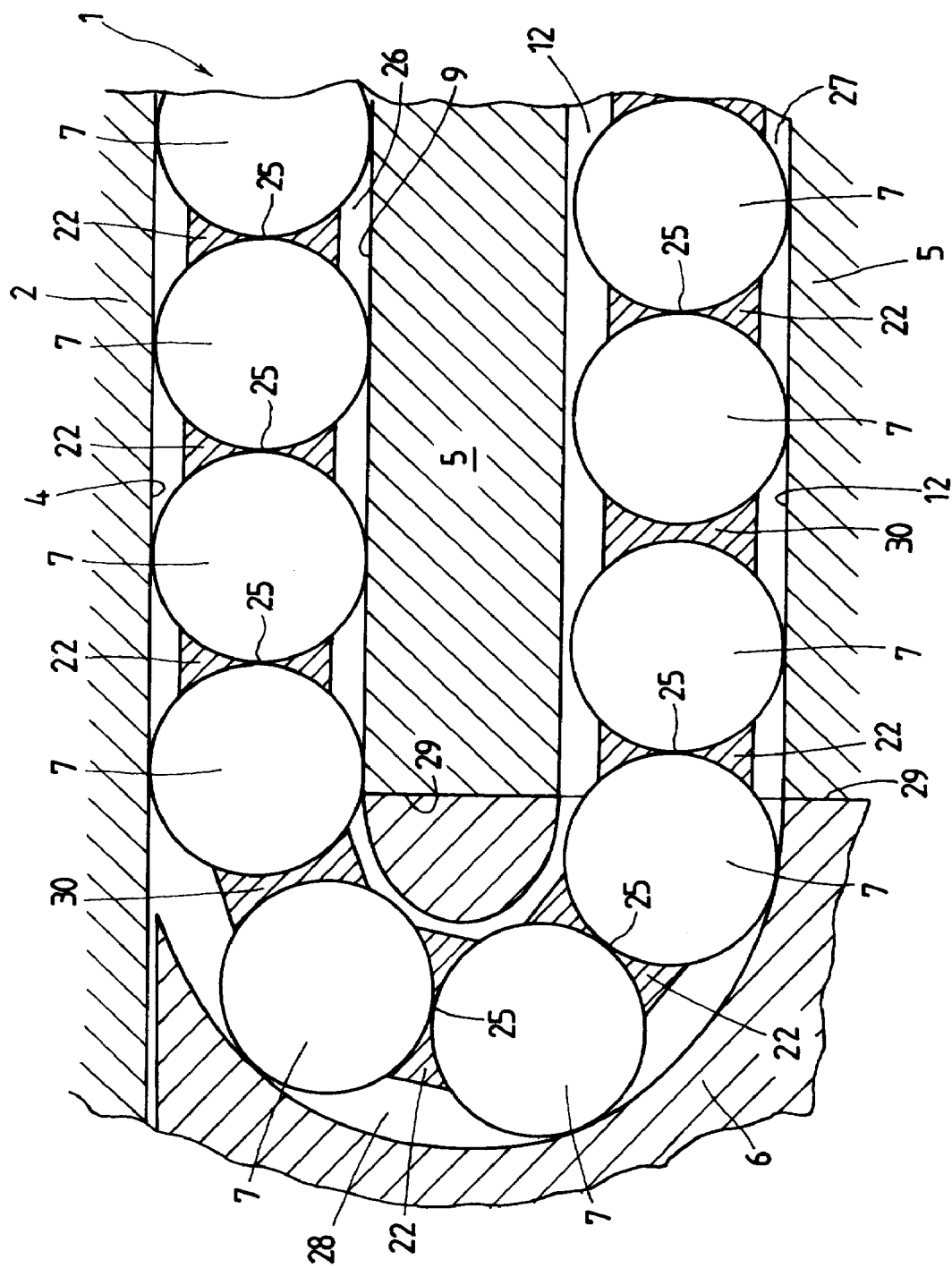
FIG. 5 is a fragmentary sectional view showing a relatively movable unit with rolling elements also embodying the present invention, which is adapted to a linear motion rolling guide unit having the lubricating rings of FIGS. 3 and 4.

Referring to FIG. 5 showing a linear motion guide unit, wherein the parts common to the linear motion guide unit in FIG. 9 are identified by the same reference character and the detailed descriptions thereof are omitted below.

The linear motion guide unit in FIG. 5 primarily comprises a linear track rail 2 and sliding element, or a slider 1, saddling on the track rail 2 for sliding movement relative to the track rail 2. The track rail 2 is provided on its lengthwise opposing side surfaces 3 with raceway grooves 4, only one of the grooves being shown. The slider 1 is composed of a casing 5 having raceway grooves 9 confronting the raceway grooves 4, and end caps 6 secured to the ends of the casing 5, only one cap being shown, which ends are opposed lengthwise or along the moving direction of the slider 1.

Raceways 26 are defined between the confronting raceway grooves 4 and 9 of the track rail 2 and casing 5. A plurality of the rolling elements, or steel balls 7, are filled in the raceways 26 so as to run in contact with each other as well as with the confronting raceway grooves 4 and 9. The casing 5 is further formed therein with bores 12 providing return-paths 27 for the balls 7. The end caps 6 are provided with turnaround-paths 28 for guiding the balls 7 from the raceways 26 towards the return-paths 27. It will be thus understood that the raceways 26, turnaround-paths 28 and return-paths 27 provide, in combination, circulation passages and the balls may run along the paths in freely circulating movement. The end caps 6 are provided separately from the casing 5 and abutted at 29 to the casing 5 so that the raceways 26 are communicated with the turnaround-paths at 29.

Other adjoining balls 7 between which no lubricating ring 22 is disposed are spaced apart by a separator 30 for keeping the adjoining balls 7 in a spaced relation in circulating movement. To help ensure good, effective lubrication support for balls 7 and raceway grooves 4 and 9, it is preferred to arrange the separators 30 in all clearances between the adjoining balls 7, except for the clearances where the lubricating rings 22 are interposed between the balls. That is, it is recommended that any one of the lubricating rings 22 and separators 30 is interposed between the adjoining balls 7. The separators 30 may be interposed in accordance with such arranging pattern that the separator 30 is interposed at regular intervals of the clearance, for example, as shown in FIG. 5, every three consecutive clearances where the lubricating rings are disposed. It will be noted that the separator 30 is not limited to the structure described above and may be substituted by other types of separator, or the separator having been disclosed in Japanese Patent Laid-Open No. 281154/1998.

The separator 30 is used to minimize, preferably to eliminate the clearance between the adjoining balls 7 in the circulating paths. Minimizing the clearances between the adjoining balls 7 results in that the lubricating rings 22 may be firmly supported at the peripheral edges of the pockets in a sliding contact relation with the balls 7 so that the lubricating rings 22 may be prevented from rattling between the balls 7 and falling out of the circulating paths. The separator 30 is preferably made of wear proof resinous material or oleoresinous material such as polyacetal resin to provide more effective lubrication and sliding property with the balls.

The lubricating rings 20, 22 are fabricated by mixing the mixture of poly (α-olefinic) polymer such as polyethylene, polypropylene or the like with a lubricating oil selected from the group of paraffin hydrocarbons, mineral oils, ester oils and ether oils, melting the mixture with heating in a predetermined mold, and solidifying the molten mixture by cooling. According to one example, a resinous material was prepared by mixing 75% by weight of turbine oils with 25% by weight of ultrahigh molecular weight polyethylene powder having a mean grain size of 30 μm. The mixture of resinous material was heated up to about 150° C. in a mold and then solidified by cooling whereby the desired product was obtained.

Figure 6:
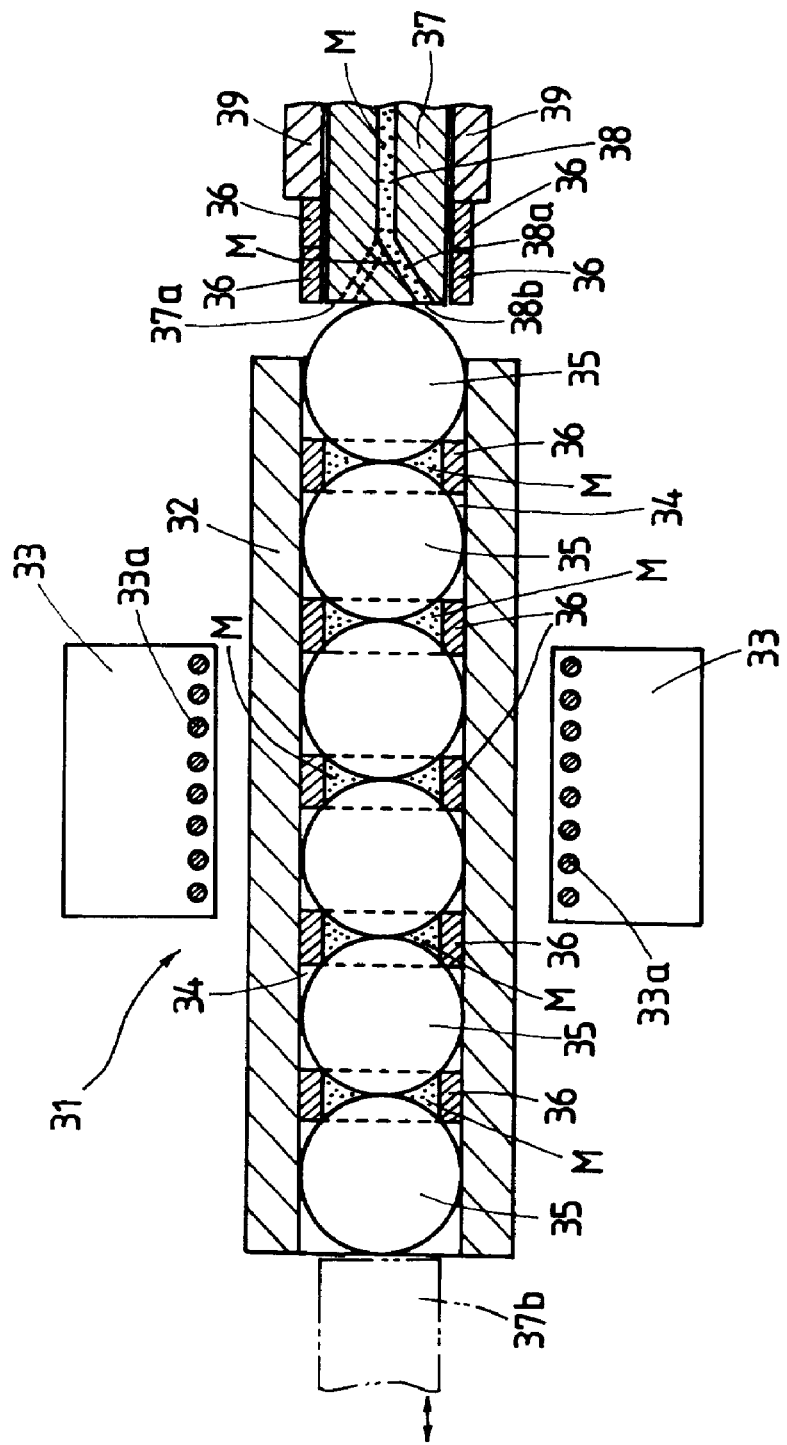
FIG. 6 is a longitudinal sectional view showing an embodiment of an apparatus for producing a lubricating ring according to the present invention.

The following explains a method of fabricating the lubricating ring 22 and an apparatus therefor with reference to FIG. 6.

A molding apparatus 31 shown in FIG. 6 is provided with a casing 32 of substantially cylindrical shape, and heating means 33 arranged at a predetermined zones around the casing, the heating means 33 being of heaters 33a adjustable in heating temperature. The molding apparatus 31 has pushing means of a push rod 37 which is disposed at one end of the casing 32. The push rod 37 is formed therein with runner 38 for feed a mixture M of lubricants with resinous materials therethrough. The runner 38 is divided into branch runners 38a which are opened at outlets 38b. A plurality of annular molds 36 are loosely, successively mounted on the push rod 37 so as to be one by one thrust out of the push rod 37 by the sliding action of a thruster which is fitted on the push rod 37 for sliding movement. It will be noted that oil baths regulated at a required temperature may be substituted for the heaters 33a in the heating means 33.

The casing 32 of the molding apparatus 31 is formed therein with a cylindrical cavity 34 in which the annular molds 36 and steel spheres 35 equivalent to the balls 7 are alternately charged. Upon retraction of both of the push rod 37 and thruster 39, a steel sphere 35 is charged at an opening of the casing 32 and then forced into the cavity 34 by the push rod 37. While the push rod 37 is abutting on the steel sphere 35, the thruster 39 forces out an annular mold 36 and at the same time the mixture M is poured in the annular mold 36 from the outlets 38b of the runner 38. Subsequently another steel sphere 35 is charged in the cavity 34 and the steps described above are repeated.

The annular mold 36 is of a hollow cylinder short in its axial length and having an outer diameter to be closely fitted in the cavity 34. It is of course that the steel sphere 35 has the diameter to be closely fitted in the cavity 34. The adjoining steel spheres 35 are in contact with each other and in engagement with the inner peripheral edges of the annular mold 36 interposed between the spheres 36. To help ensure the positive engagement of the adjoining balls 35 with each other as well as with the inner peripheral edges of the annular mold 36, it is preferred to provide a retractable backup member 37b for supporting a row of annular molds 36 and spheres 35 against the push rod 37 in synchronous with the forcing stroke of the push rod 37. The mixture M is confined in each space defined by the steel spheres 35 and interposed annular mold 36 while being forced by the following spheres 35 through the heated zone where the mixture is cured at about 150° C.

The molded lubricating rings 22 are solidified by cooling and taken out from the opened end of the casing 32 by virtue of the spheres 35 charged one after another by the push rod 37. Although the lubricating rings 22 are in general natural-cooled in the atmosphere, it is allowed to use forced-air cooling means arranged around the casing 32.

The resinous member for use in the lubricating ring 22 may be made from any material other than that described above, such as a high molecular polyethylene powder of grading, for example, fine grading of 30 μm, or coarse grading of in the range of from 250 μm to 300 μm. The high molecular polyethylene is packed in a mold and then heated under high pressure to thereby provide an open-cellular sintered resinous member. This sintered member is immersed in turbine oil for about 30 minutes whereby a lubricating ring impregnated with turbine oil may be produced. The porosity in the open-cellular sintered member may be determined in the range of from 40% to 50%. Percentage of lubricant content may be regulated according to the operating conditions of the slider 1 or nut 42 and determined to, for example, 41% by weight.

The lubricating rings 22 produced as described above are incorporated in the linear motion guide unit in FIG. 9 or the ball nut and screw assembly in FIG. 10 so as to cooperate with the rolling elements, or balls 7 or 44. The lubricant may exude from the lubricating rings 22 to be applied to the balls 7 or 44, which are in contact with the rings 22. This means that the balls 7, 44 lubricate the raceways 4, 9 or helical grooves 43, 47 which are in contact with the balls 7, 44. It will be understood that the lubricant replenishment through the nipple 11 may be used in addition to the lubricating rings 20, 22.

According to the relatively movable units in which the lubricating rings 20, 22 are interposed between the adjacent balls 7, the lubricating rings 20, 22 may serve as buffers for absorbing noise due to the collision of the balls 7 circulating through raceway paths. The relatively movable units of this invention may contribute to quieting in the apparatus, such as machine tools, assembling devices or the like.

Figure 7:
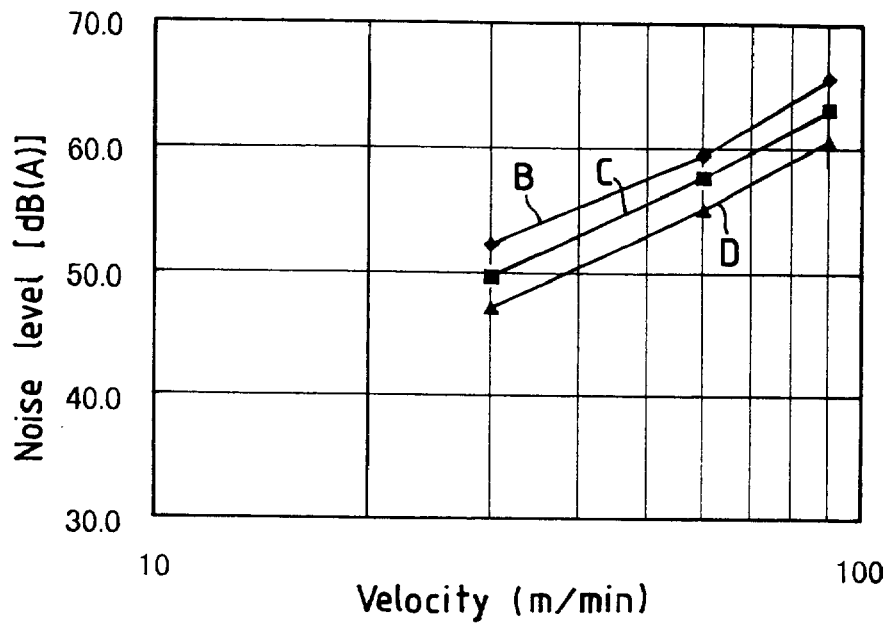
FIG. 7 is a graph representation explaining noise characteristics of a relatively movable unit according to the present invention.
Figure 8:
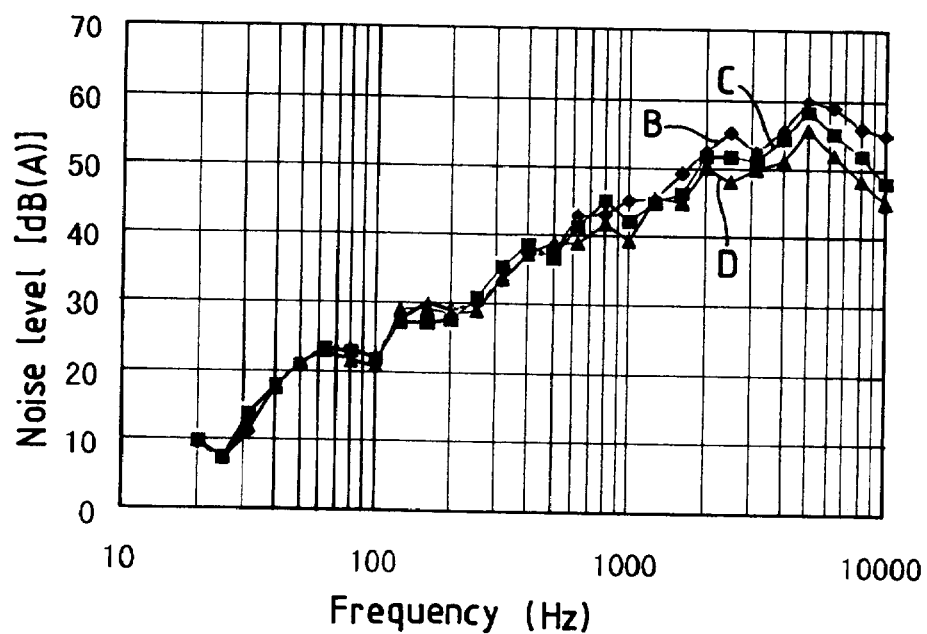
FIG. 8 is a graph representation explaining noise spectra of a relatively movable unit according to the present invention.

FIGS. 7 and 8 show the noise control by the lubricating rings 20, 22.

Shown in FIG. 7 is the sound characteristic, or relative velocity (m/min) vs. noise level [dB(A)] in the relatively movable unit of the present invention, while FIG. 8 illustrates the noise spectra (90 m/min) of the relatively movable unit of this invention, or the distribution of the noise level [dB(A)] in accordance with the frequency.

LinesB explain the relations in the prior linear motion guide unit that is lubricated by only lubricant supplied externally through the grease nipples. The lines C are the relations in the linear motion guide unit provided with the lubricating rings which are interposed between the adjoining balls. Further lines D concern with the case where the lubricant replenishment through the nipple is used in addition to the lubricating rings.

In comparison of lines B with C in connection with the sound characteristics and noise spectra, it will be understood that the quieting is accomplished by the provision of the lubricating rings interposed between the balls. The lines D apparently show it is recommended for further quieting in the linear motion guide units to replenish externally the lubricant in addition to the lubricating rings of the present invention.

What is claimed is:

1. A relatively movable unit with rolling elements comprising a first member provided with first raceway grooves, a second member movable relative to the first member and provided with second raceway grooves confronting with the first raceway grooves, rolling elements movable along raceways defined between the confronting first and second raceway grooves, and at least one lubricating ring interposed between any adjoining rolling elements so as to run through the raceways together with the rolling elements while lubricating the rolling elements;

wherein the lubricating ring is provided at the center thereof with a window so that the adjoining rolling elements make contact with each other through the window.

2. A relatively movable unit with rolling elements according to claim 1, wherein the lubricating ring is of a configuration having a circle in a section normal to a circumferential direction thereof.

3. A relatively movable unit with rolling elements according to claim 1, wherein the lubricating ring is provided inside thereof with spherical pockets for partially receiving the adjoining rolling elements.

4. A relatively movable unit with rolling elements according to claim 1, wherein the rolling elements and lubricating rings run along endless circulation passages inclusive of the raceways in freely circulating movement.

5. A relatively movable unit with rolling elements according to claim 4, wherein the endless circulation passages are comprised of the raceways formed by the second raceway grooves on the second member, turnaround-paths provided in end caps secured to the opposing ends of the second member so as to communicate with the raceways, return-paths provided in the second member so as to communicate with the turnaround-paths.

6. A relatively movable unit with rolling elements according to claim 4, wherein other adjoining rolling elements between which no lubricating ring is disposed are spaced apart by separators for keeping the adjoining rolling elements in a spaced relation in the circulation paths.

7. A relatively movable unit with rolling elements according to claim 6, wherein the lubricating rings and the separators are arranged in accordance with a predetermined consecutive relation.

8. A relatively movable unit with rolling elements according to claim 1, adapted for use in a linear motion guide unit comprising a track rail for providing the first member having on lengthwise opposing side surfaces thereof the first raceway grooves for the first raceways, and a sliding element for providing the second member mounted on the track rail for sliding movement relative to the track rail through the rolling elements.

9. A relatively movable unit with rolling elements according to claim 8, wherein the sliding element has a casing and end caps secured to the opposing ends of the casing, the casing being provided with second raceway grooves for defining the raceways in cooperation with the first raceway grooves, the casing further being provided therein with the return-paths for the rolling elements, and the end caps being formed therein with the turnaround-paths for guiding the rolling elements from the raceways to the return-paths.

10. A relatively movable unit with rolling elements according to claim 1, adapted for use in a ball nut and screw assembly comprising a screw shaft having a first helical groove equivalent to the first member having the first raceway grooves, a nut equivalent to the second member mounted on the screw shaft for rotating movement relative to the screw shaft.

11. A relatively movable unit with rolling elements according to claim 10, wherein the nut is provided with a helical groove equivalent to the second raceway grooves, the helical groove being formed in confrontation with the first helical groove so as to define the raceway therebetween, and a return-path communicated with the raceways at the opposing ends thereof so as to allow the rolling elements to run in a circulating manner.

12. A relatively movable unit with rolling elements according to claim 1, wherein the lubricating ring is produced by forming a mixture of resinous materials with lubricants in a mold under pressure in a molding apparatus, and heating the molded mixture under pressure.

13. A relatively movable unit with rolling elements according to claim 12, wherein the molding apparatus comprises annular molds to be filled with the mixture, steel balls equivalent in configuration to the rolling elements disposed between any adjacent annular molds, a casing having a cavity in which the annular molds and steel balls are alternately arranged, pushing means for compressing the mixtures in the annular molds so as to bring the steel balls into contact with each other, and heating means provided around the casing to heat the mixtures in the annular mold.

14. A relatively movable unit with rolling elements according to claim 13, wherein the annular mold is of a hollow cylinder, and the balls are charged in the cavity in the casing so as to be closely fitted with substantially no clearance while allowed to make rotation relative to each other.

15. A relatively movable unit with rolling elements according to claim 14, wherein the annular mold is closed at opposing axial openings thereof with the steel balls which are brought into engagement with inner peripheral edges of the openings.

* * * * *